US010543672B2

(12) United States Patent
Ng et al.

(10) Patent No.: US 10,543,672 B2
(45) Date of Patent: Jan. 28, 2020

(54) ADDITIVE MANUFACTURING FOR AN OVERHANG (71) Applicant: Hewlett-Packard Development Company, L.P., Houston, TX (US)

(72) Inventors: Hou T. Ng, Campbell, CA (US); Alejandro Manuel De Pena, Sant Cugat del Valles (ES)

(73) Assignee: Hewlett-Packard Development Company, L.P., Spring, TX (US)

(*) Notice: Subject to any disclaimer, the term of this patent is extended or adjusted under 35 U.S.C. 154(b) by 194 days.

(21) Appl. No.: 15/306,480

(22) PCT Filed: Sep. 2, 2014

(86) PCT No.: PCT/US2014/053715
§ 371 (c)(1),
(2) Date: Oct. 24, 2016

(87) PCT Pub. No.: WO2016/036348
PCT Pub. Date: Mar. 10, 2016

(65) Prior Publication Data
US 2017/0043535 A1 Feb. 16, 2017

(51) Int. Cl.
 B33Y 10/00 (2015.01)
 B33Y 30/00 (2015.01)
 B33Y 50/02 (2015.01)
(52) U.S. Cl.
 CPC ............... B33Y 30/00 (2014.12); B33Y 10/00 (2014.12); B33Y 50/02 (2014.12)

(58) Field of Classification Search
 CPC ......... B33Y 10/00; B33Y 30/00; B33Y 50/02; B29C 64/386; B29C 64/165; B29C 67/0088
 See application file for complete search history.

(56) References Cited

U.S. PATENT DOCUMENTS 6,589,471 B1 * 7/2003 Khoshnevis ........... B33Y 10/00
 264/497
7,241,415 B2 * 7/2007 Khoshnevis ............ B22F 3/008
 264/113
(Continued)

FOREIGN PATENT DOCUMENTS

EP 1452298 9/2004
EP 1541321 6/2005
(Continued)

OTHER PUBLICATIONS

Bai, J.G. et al, Inkjet Printable Nanosilver Suspensions for Enhanced Sintering Quality in Rapid Manufacturing, 2007, Nanotechnology, vol. 18, No. 18, http://iopscience.iop.org.
(Continued)

Primary Examiner — Michael P Wieczorek
(74) Attorney, Agent, or Firm — HP Inc. Patent Department (57) ABSTRACT In one example, a non-transitory processor readable medium with instructions thereon that when executed cause an additive manufacturing machine to inhibit build material from coalescing in an area of a first layer of build material where a second slice of an object will overhang a first slice of the object formed in the first layer of build material.

8 Claims, 9 Drawing Sheets

(56) References Cited

U.S. PATENT DOCUMENTS

| | | | | |
|---|---|---|---|---|
| 7,258,720 B2* | 8/2007 | Fuwa | ............. | B22F 1/0003 |
| | | | | 75/252 |
| 7,378,052 B2* | 5/2008 | Harryson | ........... | B22F 3/004 |
| | | | | 264/308 |
| 7,550,518 B2* | 6/2009 | Bredt | ............. | B29C 41/003 |
| | | | | 106/162.9 |
| 8,047,251 B2 | 11/2011 | Khoshnevis | | |
| 8,245,757 B2 | 8/2012 | Crump et al. | | |
| 9,579,852 B2* | 2/2017 | Okamoto | ......... | B29C 67/0092 |
| 2002/0020945 A1 | 2/2002 | Cho et al. | | |
| 2004/0018107 A1 | 1/2004 | Khoshnevis | | |
| 2004/0251574 A1 | 12/2004 | Collins et al. | | |
| 2005/0208168 A1 | 9/2005 | Hickerson et al. | | |
| 2007/0238056 A1* | 10/2007 | Baumann | ........... | B33Y 10/00 |
| | | | | 430/325 |
| 2011/0076438 A1 | 3/2011 | Farr et al. | | |
| 2011/0178621 A1 | 7/2011 | Heide | | |
| 2012/0231175 A1 | 9/2012 | Tan | | |

FOREIGN PATENT DOCUMENTS

| | | |
|---|---|---|
| JP | 2006183146 | 7/2006 |
| TW | I301095 | 9/2008 |
| WO | WO-2006091842 | 8/2006 |
| WO | WO 2013/167528 A1 | 11/2013 |

OTHER PUBLICATIONS

International Search Report and Written Opinion for International Application No. PCT/US2014/053715 dated May 20, 2015, 11 pages.

* cited by examiner

ADDITIVE MANUFACTURING FOR AN OVERHANG

BACKGROUND

Additive manufacturing machines produce 3D (three-dimensional) objects by building up layers of material. Some additive manufacturing machines are commonly referred to as "3D printers" because they often use inkjet or other printing technology to apply some of the manufacturing materials. 3D printers and other additive manufacturing machines make it possible to convert a CAD (computer aided design) model or other digital representation of an object directly into the physical object.

DRAWINGS

The same part numbers designate the same or similar parts throughout the figures.

DESCRIPTION

Additive manufacturing machines make a 3D object through the solidification of one or more layers of a build material. Additive manufacturing machines make objects based on data in a 3D model of an object created, for example, with a CAD computer program product. The model data is processed into slices each defining that part of a layer or layers of build material to be solidified. The examples of additive manufacturing described below use a technique sometimes referred to as "light area processing" (LAP) in which a light absorbing ink or other suitable coalescing agent is dispensed on to a layer of build material in the desired pattern and then exposed to light to solidify the patterned build material. LAP coalescing agents absorb light to generate heat that sinters, melts or otherwise solidifies (or initiates solidification of) the patterned build material.

Coalescing agent may bleed into build material outside the desired pattern, causing the unwanted solidification of build material. Also, heat generated in the patterned build material can, under some circumstances, propagate into and solidify surrounding, unpatterned build material. The unwanted solidification of build material can degrade the overall dimensional accuracy and appearance of the manufactured object. Such degradation is often manifested, for example, in poorly defined edges.

Modifier agents have been developed to block or neutralize the effects of the coalescing agent. The unwanted solidification of build material may be controlled by dispensing a coalescence modifier agent on to unpatterned build material surrounding build material patterned with a coalescing agent. For example, modifier agents and additive manufacturing processes are described in international patent application no. PCT/US14/36169 filed Apr. 30, 2014, and titled Three Dimensional Printing Method, to prevent or reduce the degree of coalescence of targeted areas of build material to help control the dimensional accuracy and surface roughness along the edges in each layer of the manufactured object.

It has been discovered that coalescence modifier agents may also be used to control the unwanted fusing between layers of build material, fusing that can lead to excessive surface roughness in objects with overhangs. Accordingly, a new additive manufacturing process has been developed to inhibit or prevent interlayer fusing to obtain smooth, well defined overhangs. In one example, the new process includes forming a first layer of build material, solidifying build material in the first layer to form a first slice, and dispensing a coalescence modifier agent on to build material in the first layer covering an area where a second slice will overhang the first slice. The modifier agent prevents, or at least inhibits, build material in the second layer fusing with build material in the first layer in the overhang area, so that the bottom of the overhang in the second slice will be smoother and more well defined. The modifier agent may be dispensed on to the first layer of build material before solidification of the first slice, for example to also provide edge control, or after solidification of the first slice.

A processor readable medium with instructions for overhang surface control using a coalescence modifier agent during additive manufacturing may be implemented, for example, in a CAD computer program product, in an object model processor, or in the controller for the additive manufacturing machine.

As used in this document: a "coalescing agent" means a substance that causes or helps cause a build material to coalesce or solidify or to both coalesce and solidify; a "coalescence modifier agent" means a substance that inhibits or prevents solidification of a build material, for example by modifying the effect of a coalescing agent; and a "slice" means one or more slices of a multi-slice object or the object itself for a single slice object.

Figure 1:
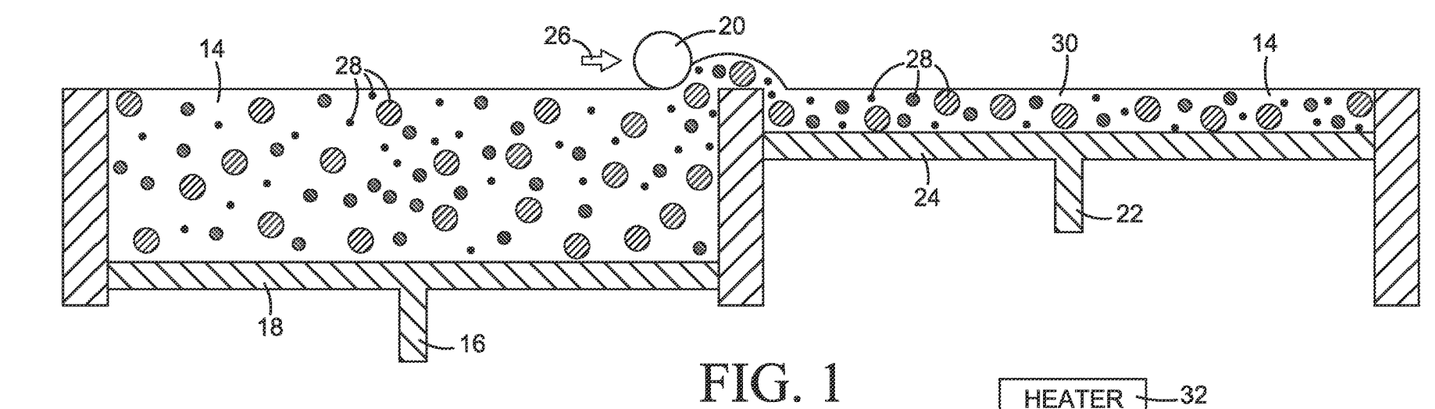
FIGS. 1-10 present a sequence of sections illustrating one example for additive manufacturing an object with an overhang.
Figure 8:
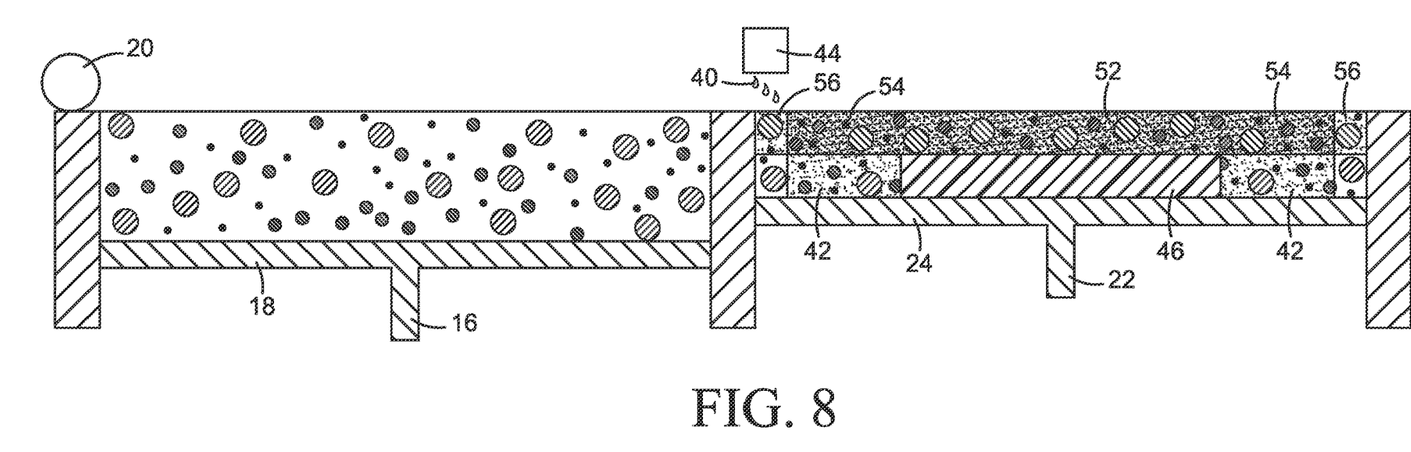
Figure 9:
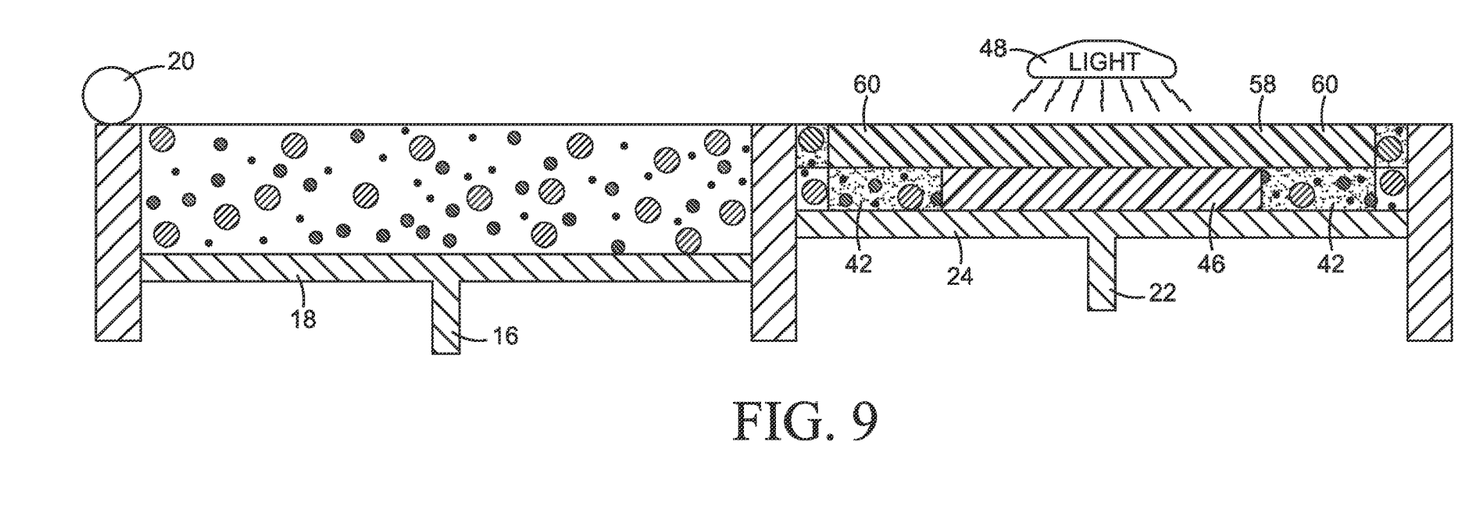
Figure 10:
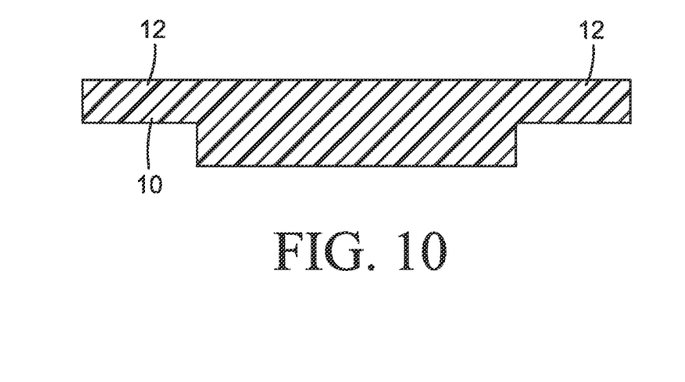
Figure 11:
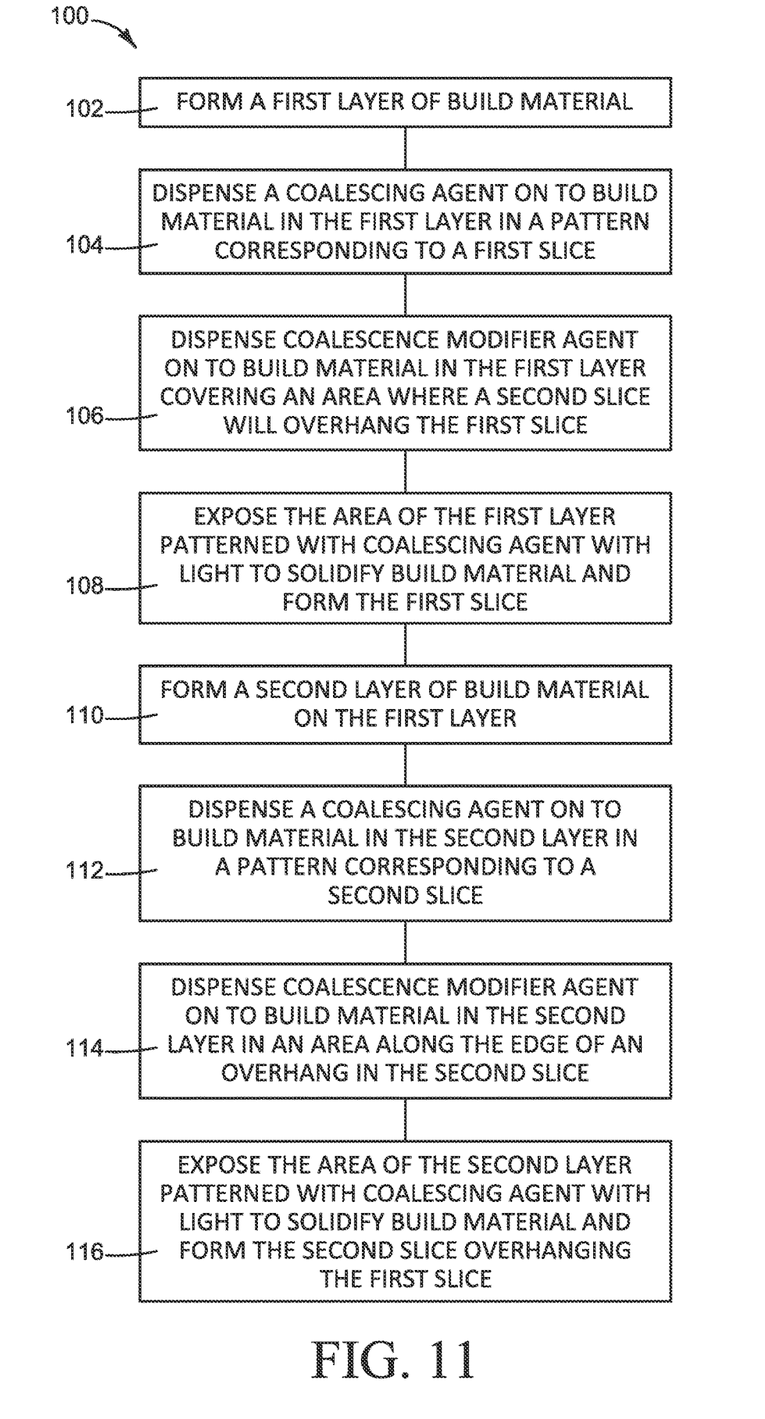
FIGS. 11 and 12 are flow diagrams illustrating example additive manufacturing processes.
Figure 12:
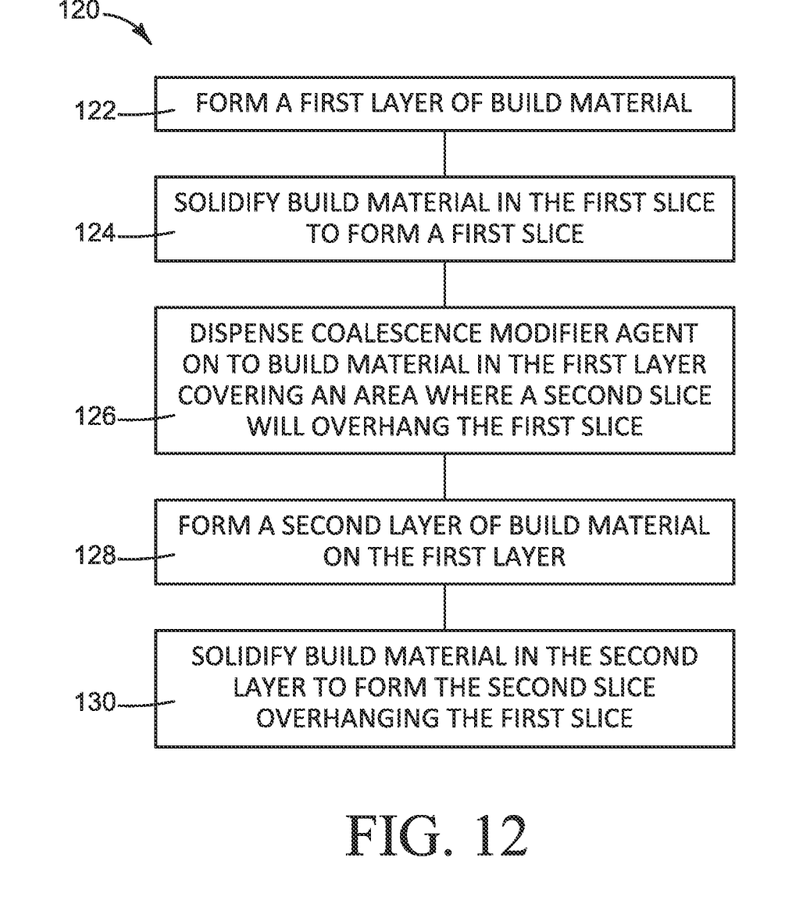

The sequence of sections presented in FIGS. 1-10 illustrate one example for manufacturing an object 10 (FIG. 10) with an overhang 12 (FIG. 10). FIGS. 11 and 12 are flow diagrams illustrating example additive manufacturing processes 100 and 120, respectively, implemented in FIGS. 1-10. Referring to FIG. 1, in this example a supply of powdered build material 14 is held on a delivery piston 16 in a supply bed 18. A roller 20 or other suitable layering device moves build material 14 from supply bed 18 to a receiving piston 22 in a manufacturing bed 24, as indicated by arrow 26. Pistons 16 and 22 move up and down as build material 14 is moved from supply bed 18 to manufacturing bed 24. Any suitable build material 14 may be used to make the desired solid object, which may be hard or soft, rigid or flexible, elastic or inelastic. Also, while a powdered build material 14 is depicted by particles 28 in this example, suitable non-powdered build materials could also be used.

Figure 2:
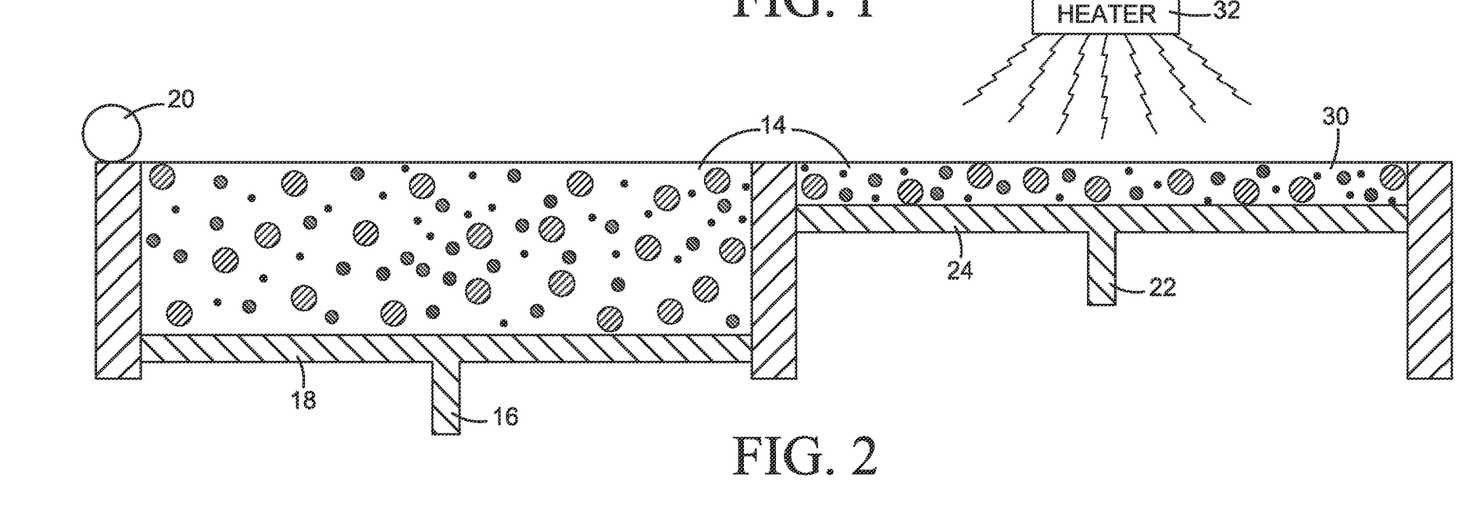

In FIG. 1, a first layer 30 of build material 14 is formed in manufacturing bed 24 (block 102 in FIG. 11). In some implementations, it may be desirable to pre-heat build material 14 in the first few layers to help keep each layer flat during solidification. Individual layers of build material 14 may be pre-heated in bed 24, as shown in FIG. 2, or build material 14 may be pre-heated in supply bed 18. While the pre-heating temperature will vary depending on the characteristics of build material 14, the pre-heating temperature usually will be 5° C. to 50° C. below the melting point of the build material (e.g., 150° C. to 170° C. for a PA 12 build material). Any suitable heater 32 may be used.

Figure 3:
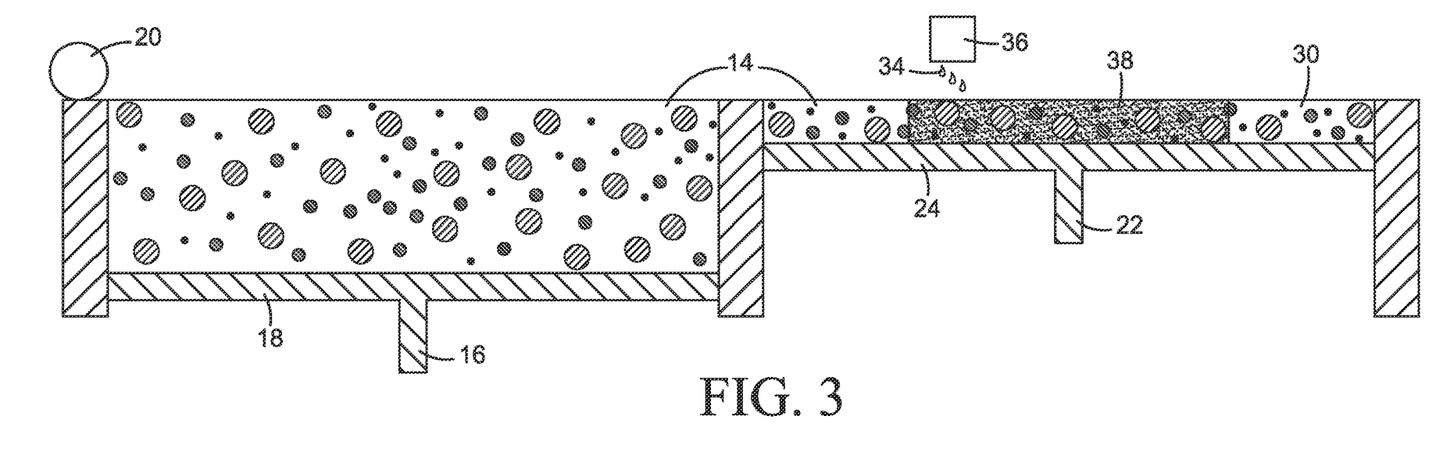
Figure 4:
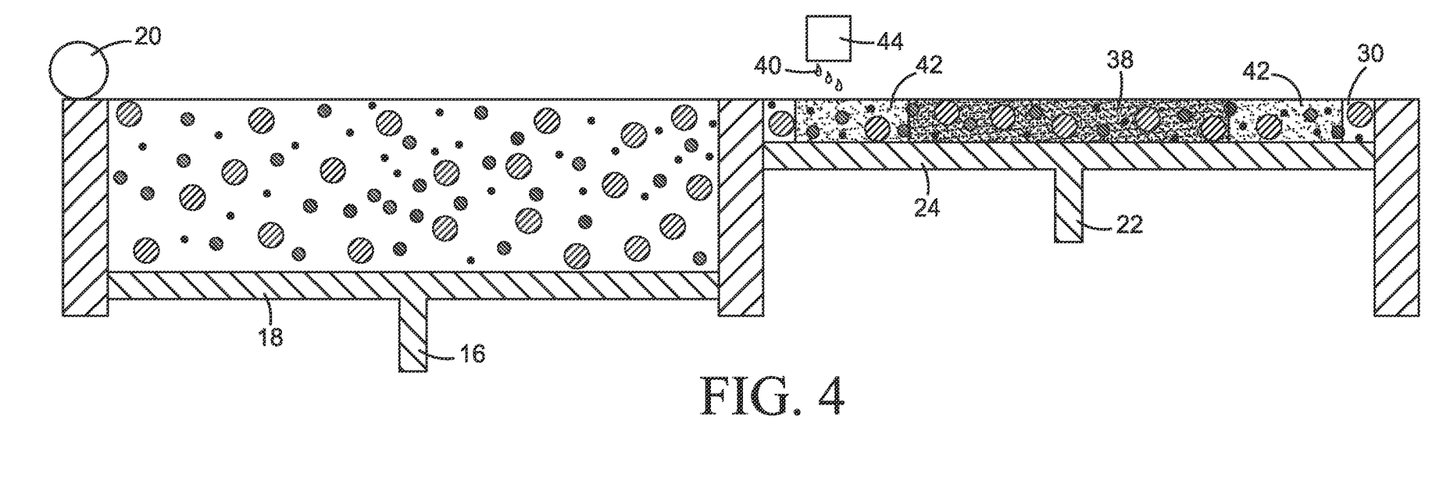

In FIG. 3, a coalescing agent 34 is dispensed on to build material 14 in layer 30 in a pattern corresponding to the object slice (block 104 in FIG. 11), for example with an inkjet type dispenser 36. This pattern for coalescing agent 34 is depicted by an area 38 of dense stippling in the figures. In FIG. 4, a coalescence modifier agent 40 is dispensed on to build material 14 in layer 30 covering an area 42 where a second object slice will overhang the first slice (block 106 in FIG. 11), for example with an inkjet type dispenser 44. Overhang area 42 covered by coalescence modifier agent 40 is depicted by light stippling in the figures. Coalescence modifier agent 40 may also be dispensed on to other areas of build material layer 30 to help define other aspects of the object slice, including interspersed with the pattern of the coalescing agent to change the material characteristics of the slice. Although two distinct inkjet type dispensers 36, 44 are shown, agents 34 and 40 could be dispensed from the same dispensers integrated into a single device, for example using different printheads (or groups of printheads) in a single inkjet printhead assembly.

Figure 5:
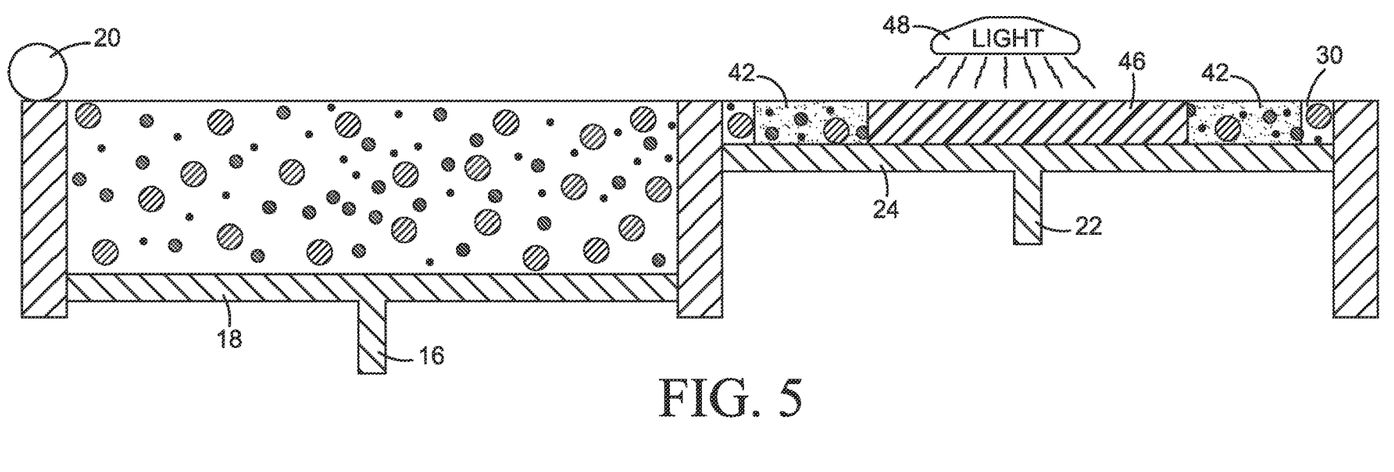
Figure 6:
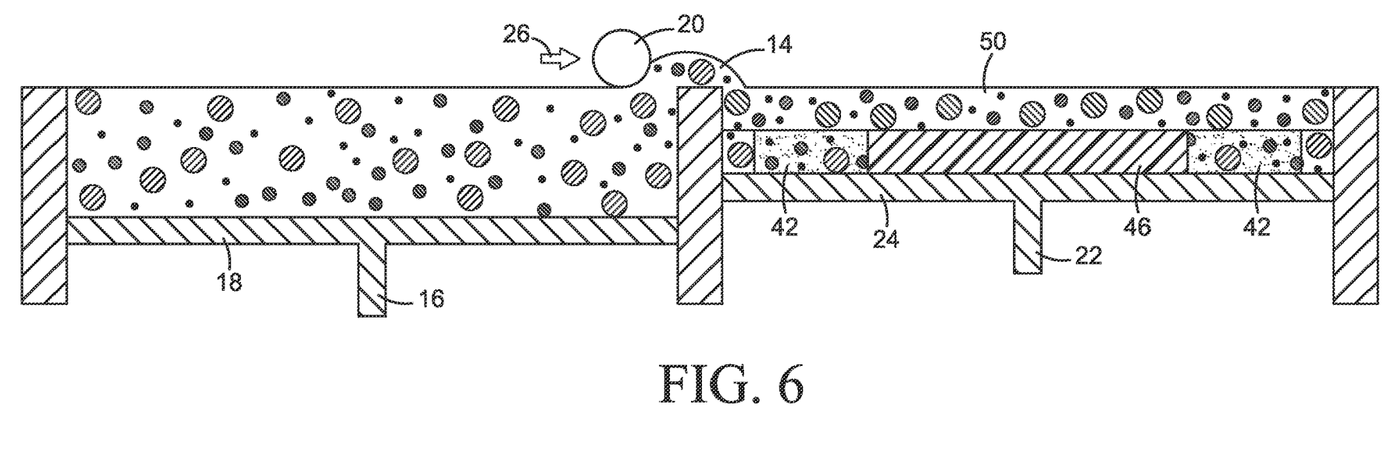
Figure 7:
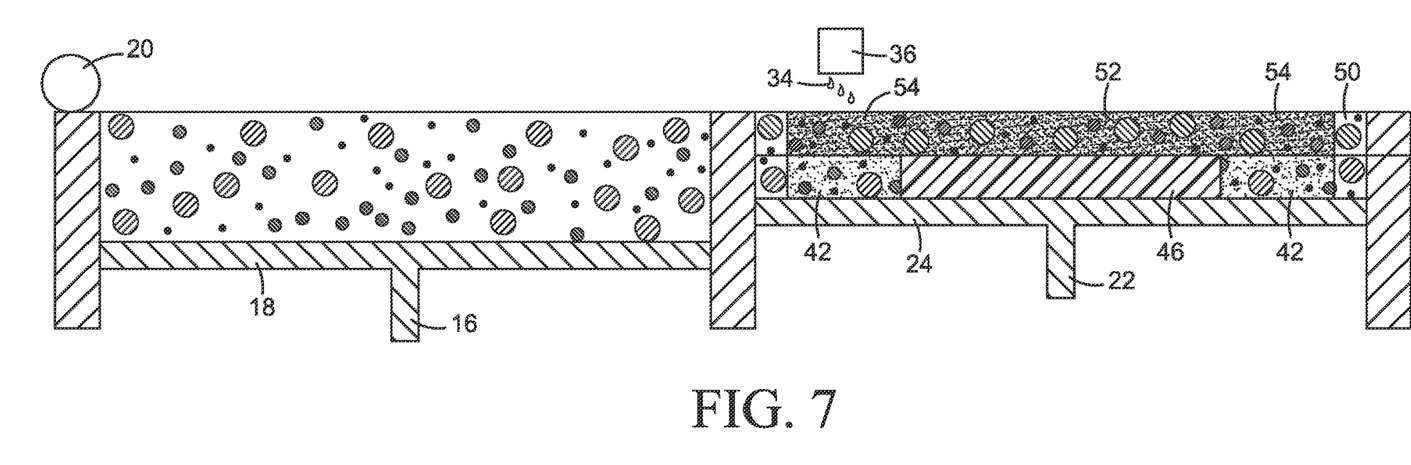

In FIG. 5, the area of layer 30 patterned with coalescing agent 34 is exposed to light to solidify build material and form first object slice 46 (block 108 in FIG. 11). In FIG. 6, a second layer 50 of build material 14 is formed in manufacturing bed 24 over first layer 30 (block 110 in FIG. 11). In FIG. 7, a coalescing agent 34 is dispensed on to build material 14 in layer 50 in a pattern in an area 52 corresponding to the second object slice (block 112 in FIG. 11), including an area 54 overhanging first slice 46. In FIG. 8, a coalescence modifier agent 40 is dispensed on to build material 14 in layer 50 in area 56 to help prevent the unwanted solidification of build material along the edge of the overhang (block 114 in FIG. 11).

In FIG. 9, the area 52 of layer 50 patterned with coalescing agent 34 is exposed to light to solidify build material to form second object slice 58 overhanging first slice 46 (block 116 in FIG. 11). Second slice 58 includes part 60 that hangs over first slice 46. While distinct first and second slices 46 and 58 are shown in FIG. 9, the two slices actually fuse together into a single part upon solidification of the second slice. The now fused slices 58, 46 may be removed from manufacturing bed 24 as a finished object 10 shown in FIG. 10. While a simple two-slice object 10 is shown, the same process steps may be used to form more complex, multi-slice objects.

FIG. 12 illustrates an example of an additive manufacturing process 120. Referring to FIG. 12, a first layer of build material is formed (block 122) and build material in the first layer solidified to form a first slice (block 124), for example as described above with reference to FIGS. 1-3 and 5. A coalescence modifier agent is dispensed on to build material in the first layer covering an area where a second slice will overhang the first slice (block 126), for example as described above with reference to FIG. 4. The coalescence modifier agent may be dispensed before, during or after solidifying build material in the first layer at block 124. A second layer of build material is formed on the first layer of build material (block 128) and build material in the second layer is solidified to form a second slice overhanging the first slice (block 130), for example as described above with reference to FIGS. 6-9.

Figure 13:
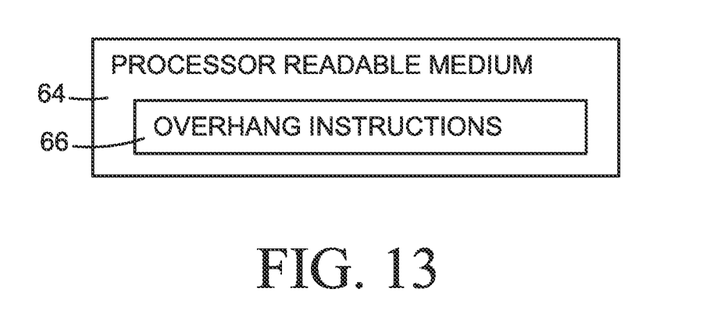
FIG. 13 illustrating one example of a processor readable medium with instructions to help form an overhang during the additive manufacture of an object with an overhang.

FIG. 13 is a block diagram illustrating a processor readable medium 64 with instructions 66 to help form an overhang during the manufacture of a 30 object. A processor readable medium 64 is any non-transitory tangible medium that can embody, contain, store, or maintain instructions for use by a processor. Processor readable media include, for example, electronic, magnetic, optical, electromagnetic, or semiconductor media. More specific examples of suitable processor readable media include a hard drive, a random access memory (RAM), a read-only memory (ROM), memory cards and sticks and other portable storage devices.

Overhang instructions 66 include instructions to inhibit build material from coalescing in an area of a first layer of build material where a second slice of an object will overhang the first slice, for example by dispense a coalescing modifier agent at block 126 in FIG. 12. Instructions 66 may include other additive manufacturing instructions, for example instructions to form and solidify shown at blocks 122, 124, 128 and 130 in FIG. 12. Processor readable medium 64 with instructions 66 may be implemented, for example, in a CAD computer program product, in an object model processor, or in a controller for an additive manufacturing machine. Control data to inhibit solidification can be generated, for example, by processor readable instructions on the source application, usually a CAD computer program product, in an object model processor, or by processor readable instructions on the additive manufacturing machine.

Figure 14:
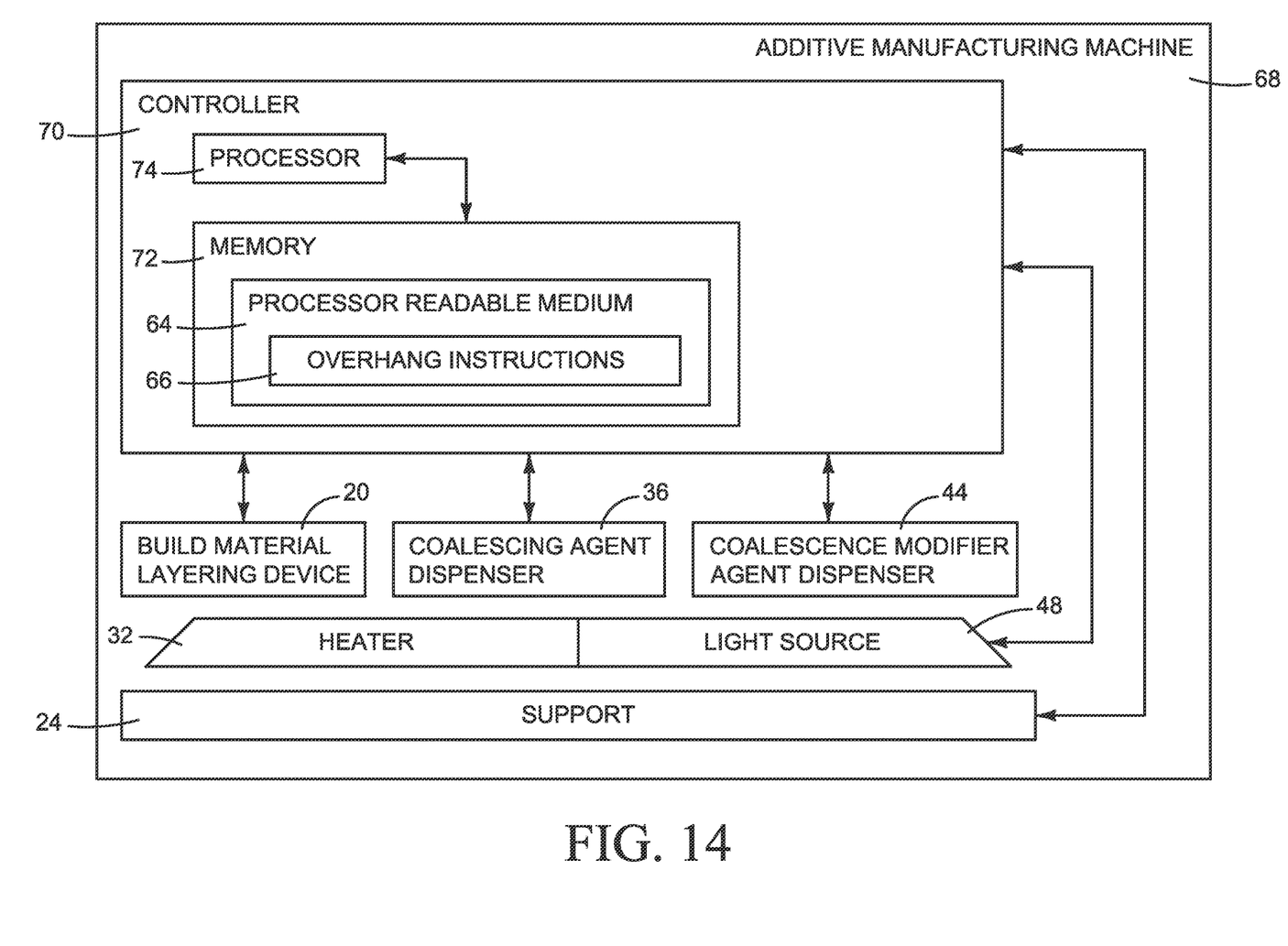
FIG. 14 is a block diagram illustrating one example of an additive manufacturing machine implementing a controller with a processor readable medium with overhang instructions such as the medium shown in FIG. 13.

FIG. 14 is a block diagram illustrating one example of an additive manufacturing machine 68 implementing a controller 70 with overhang instructions 66. Referring to FIG. 14, machine 68 includes controller 70, a manufacturing bed or other suitable support 24, a roller or other suitable build material layering device 20, a coalescing agent dispenser 36, a coalescence modifier agent dispenser 44, a heater 32 and a light source 48. The in-process object structure is supported on support 24 during manufacturing. In some machines 68, support 24 may support the in-process structure during uncaking. Also, in some machines 68, support 24 is movable at the urging of controller 70 to compensate for the changing thickness of the in-process structure, for example as layers of build material are added during manufacturing.

Build material layering device 20 layers build material on support 24 and on the in-process structures and may include, for example, a device to dispense the build material and a blade or roller to distribute the build material uniformly to the desired thickness for each layer. Coalescing agent dispenser 36 dispenses coalescing agent selectively at the direction of controller 70 on to build material, for example as described above with reference to FIGS. 1-11. Coalescence modifier agent dispenser 44 dispenses modifier agent selectively at the direction of controller 70 on to build material, for example as described above with reference to FIGS. 1-11. While any suitable dispensers 36, 44 may be used, inkjet printheads are often used in additive manufacturing machines because of the precision with which they can dispense agents and their flexibility to dispense different types and formulations of agents. Manufacturing machine 68 may include a heater 32 if it is desired to pre-heat the build material. Manufacturing machine 36 includes a light source 48 to apply light energy to solidify build material treated with coalescing agent.

Controller 70 represents the processor (or multiple processors), the associated memory (or multiple memories) and instructions, and the electronic circuitry and components needed to control the operative elements of machine 68. In particular, controller 70 includes a memory 72 having a processor readable medium 64 with overhang instructions 66 and a processor 74 to read and execute instructions 66. For example, controller 70 would receive control data and other instructions from a CAD program to make an object that includes an overhang and execute local overhang instructions 66 as part of the process of making the object.

Figure 15:
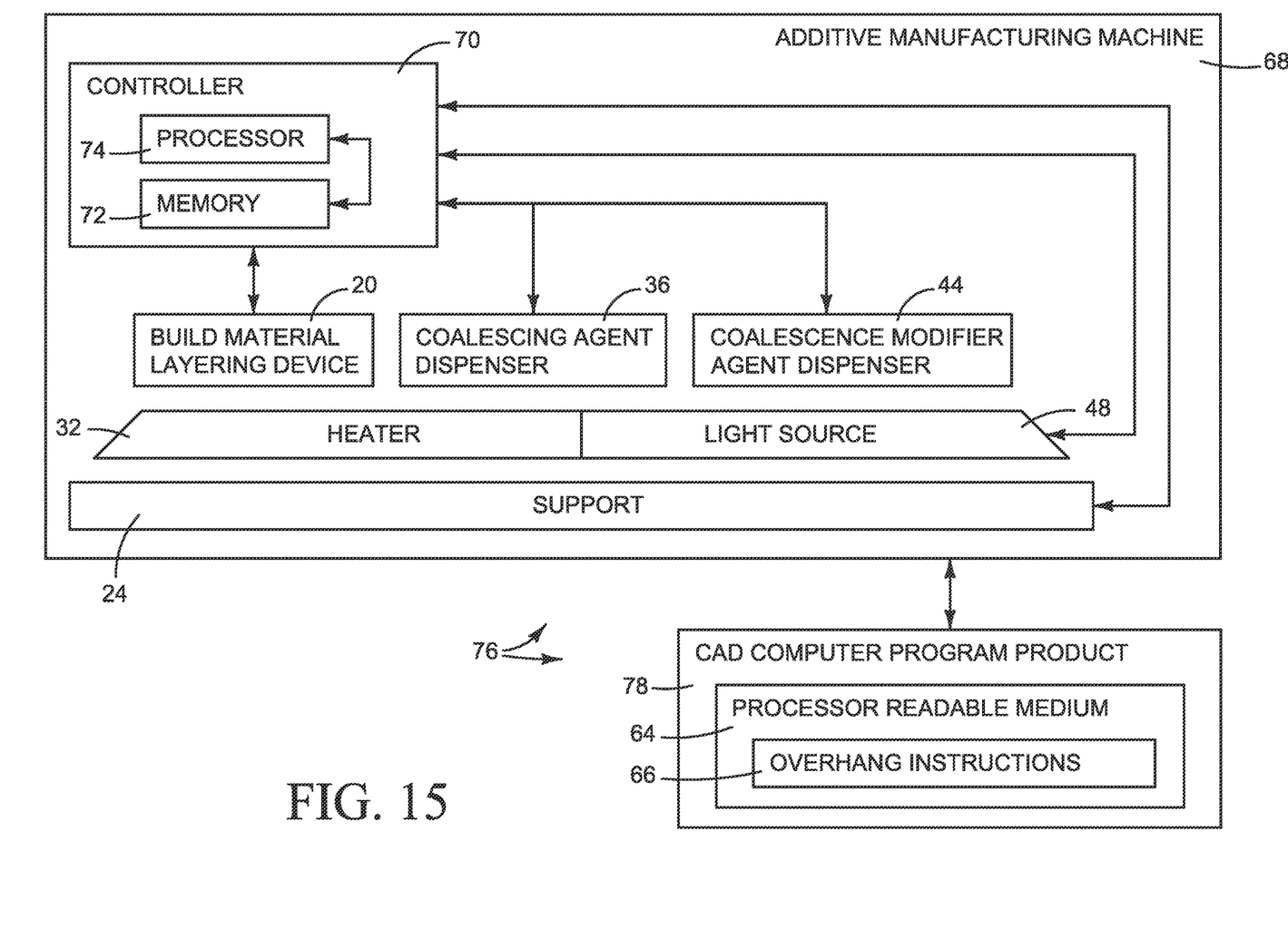
FIG. 15 is a block diagram illustrating one example of an additive manufacturing system implementing a CAD computer program product with a processor readable medium with overhang instructions such as the medium shown in FIG. 13.

Alternatively, overhang instructions 66 may be embodied in a processor readable medium 64 separate from controller 70, for example as part of a CAD computer program product shown in FIG. 15. Referring to FIG. 15, an additive manufacturing system 76 includes an additive manufacturing machine 68 operatively connected to a CAD computer program product 78 with overhang instructions 66 residing on a processor readable medium 64. Any suitable connection between machine 68 and CAD program product 78 may be used to communicate instructions and control data to machine 68 including, for example, a wired link, a wireless link, and a portable connection such as a flash drive or compact disk.

Light source 48 applies light energy to build material to cause the solidification of portions of the build material according to where coalescing agent has been delivered or has penetrated. In some examples, light source 48 is an infra-red (IR) or near infra-red light source, or a halogen light source. Light source 48 may be a single light source or an array of multiple light sources. In some examples, light source 48 is configured to apply light energy in a substantially uniform manner simultaneously to the whole surface of a layer of build material. In other examples, light source 48 is configured to apply energy to only a select areas of the whole surface of a layer of build material. In these examples light source 48 may be moved or scanned across the layer of build material such that a substantially equal amount of energy is applied to the selected areas or across the whole surface of a layer of build material.

The combination of build material, coalescing and coalescence modifier agents, and light energy may be selected for an object slice so that (1) build material with no coalescing agent does not coalesce when the energy is applied, (2) build material with only coalescing agent solidifies when energy is applied; or (3) build material with both agents undergo a modified degree of coalescence between no coalescence and solidification with or without the application of energy.

Build material 14 may be a powder, a liquid, a paste, or a gel. Examples of build material 14 include semi-crystalline thermoplastic materials with a processing window of greater than 5° C. (i.e., the temperature range between the melting point and the re-crystallization temperature). Some specific examples of the build material 14 include polyamides (e.g., PA or nylon 11, PA or nylon 12, PA or nylon 6, PA or nylon 8, PA or nylon 9, PA or nylon 66, PA or nylon 612, PA or nylon 812, PA or nylon 912, etc.). Other specific examples of the build material 14 include polyethylene, polyethylene terephthalate (PET), and amorphous variation of these materials. Still other examples of suitable build materials 16 include polystyrene, polyacetals, polypropylene, polycarbonate, polyester, thermal polyurethanes, other engineering plastics, and blends of any two or more of the polymers listed herein. Core shell polymer particles of these materials may also be used.

Build material 14 may have a melting point ranging from about 50° C. to about 400° C. In some implementations, it is desirable that the melting point of the build material 14 be less than (lower than) the melting point of an inorganic salt used in the modifying agent. As examples, polyamide 12 having a melting point of 180° may be used, or thermal polyurethanes having a melting point ranging from about 100° C. to about 165° C. may be used. When a combination of polymer particles is used in the build material 14, at least one of the particles has a melting point below the melting point of the inorganic salt. In an example, each of the plurality of polymer particles used in the build material 14 has a melting point below the melting point of the inorganic salt.

Build material 14 may be made up of similarly sized particles or differently sized particles. In the example shown in FIGS. 1-9, the build material 14 includes particles of three different sizes. As one example of the different sizes for each of the build material particles, the average of each size particle may be greater than 50 μm, between 10 μm and 30 μm, and less than 10 μm. In an example, the largest particles are present in an amount ranging from 70 wt % to 95 wt %, the medium particles present in an amount ranging from 0.5 wt % to 21 wt %, and the smallest particles present in an amount ranging from greater than 0 wt % up to 21 wt %.

Build material 14 may include, in addition to polymer particles, a charging agent and/or a flow aid. Charging agent(s) may be added to suppress tribo-charging. Examples of suitable charging agent(s) include aliphatic amines (which may be ethoxylated), aliphatic amides, quaternary ammonium salts (e.g., behentrimonium chloride or cocamidopropyl betaine), esters of phosphoric acid, polyethylene glycol esters, or polyols. Some suitable commercially available charging agents include HOSTASTAT® FA 38 (natural based ethoxylated alkylamine), HOSTASTAT® FE2 (fatty acid ester), and HOSTASTAT® HS 1 (alkane sulfonate), each of which is available from Clariant hit. Ltd.). In an example, the charging agent is added in an amount ranging from greater than 0 wt % to less than 5 wt % based upon the total wt % of the polymer particles. A flow aid improves the flowability of build material 14 by reducing friction, lateral drag, and tribo-charge buildup, and may be particularly desirable when build material particles are less than 25 μm in size. Examples of suitable flow aids include tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminium silicate (E555), calcium aluminosilicate (E556), bentonite (E558), aluminium silicate (E559), stearic acid (E570), or polydimethylsiloxane (E900). In an example, the flow aid is added in an amount ranging from greater than 0 wt % to less than 5 wt % based upon the total wt % of the particles.

Suitable coalescing agents 34 include water-based dispersions with an active, radiation absorbing binding agent. The active agent may be, for example, an infrared light absorber, a near infrared light absorber, or a visible light absorber. As one example, the coalescing agent may be an ink-type formulation including carbon black as the active material. An example of this ink-type formulation is commercially known as CM997A available from Hewlett-Packard Company. Examples of inks including visible light enhancers as the active agent are dye based colored ink and pigment based colored ink. Examples of pigment based inks include the commercially available inks CM993A and CE042A, available from Hewlett-Packard Company. The aqueous nature of some coalescing agent enables the coalescing agent to penetrate the layer of build material. For hydrophobic build materials the presence of a co-solvent and/or a surfactant in the coalescing agent may assist in obtaining the desired wetting. One or more coalescing agent may be dispensed to form each slice.

Suitable coalescence modifier agents may separate individual particles of the build material to prevent the particles from joining together and solidifying as part of the slice. Examples of this type of coalescence modifier agent include colloidal, dye-based, and polymer-based inks, as well as solid particles that have an average size less than the average size of particles of the build material. The molecular mass of the coalescence modifier agent and its surface tension should be such that it enables the agent to penetrate sufficiently into the build material to achieve the desired mechanical separation. In one example, a salt solution may be used as a coalescence modifier agent. In other examples, inks commercially known as CM996A and CN673A available from Hewlett-Packard Company may be used as a coalescence modifier agent.

Suitable coalescence modifier agents may act to modify the effects of a coalescing agent by preventing build material from reaching temperatures above its melting point during heating. A fluid that exhibits a suitable cooling effect may be used as this type of coalescence modifier agent. For example, when build material is treated with a cooling fluid, energy applied to the build material may be absorbed evaporating the fluid to help prevent build material from reaching its melting point. Thus, for example, a fluid with a high water content may be a suitable coalescence modifier agent.

Other types of coalescence modifier agent may be used. An example of a coalescence modifier agent that may increase the degree of coalescence may include, for example, a plasticizer. Another example of a coalescence modifier agent that may increase the degree of coalescence may include a surface tension modifier to increase the wettability of particles of build material.

In one example, the modifier agent includes an inorganic salt, a surfactant, a co-solvent, a humectant, a biocide, and water. In some examples, the modifier agent consists of these components, and no other components. It has been found that this particular combination of components effectively reduces or prevents coalescence bleed, in part because of the presence of the inorganic salt. An inorganic salt used in the modifier agent has a relatively high heat capacity, but a relatively low heat emissivity. These characteristics render the modifier agent capable of absorbing the radiation (and its associated thermal energy) applied thereto, and also capable of retaining a bulk of the thermal energy therein. As such, very little, if any, of the thermal energy is transferred from the modifier agent to the build material.

In addition, the inorganic salt may also have a lower thermal conductivity and/or a higher melting point than the thermal conductivity and/or melting point of the build material and, in some instances, of the active material in the coalescing agent. Upon absorbing radiation and thermal energy, the inorganic salt does not melt, and also does not transfer a sufficient amount of heat to the surrounding build material. Therefore, the modifier agent can effectively reduce curing of the build material when build material is in contact with both the coalescing agent and the modifier agent, and prevent curing when the build material is in contact with the modifier agent alone.

An inorganic salt in the modifier agent may be water soluble. Examples of suitable water soluble inorganic salts include sodium iodide, sodium chloride, sodium bromide, sodium hydroxide, sodium sulfate, sodium carbonate, sodium phosphate, potassium iodide, potassium chloride, potassium bromide, potassium hydroxide, potassium sulfate, potassium carbonate, potassium phosphate, magnesium iodide, magnesium chloride, magnesium bromide, magnesium phosphate, and combinations thereof. The inorganic salt may be present in an amount ranging from about 5.0 wt % to about 50 wt % with respect to a total weight of the modifier agent.

The modifier agent may also include the surfactant. The type and amount of surfactant may be selected so that a contact angle with the build material is less than 45°. The components of the modifier agent may be mixed together, and then the amount of surfactant adjusted to achieve the desirable contact angle. It has been found that a suitable amount of surfactant to achieve the desired contact angle may range from 0.1 wt % to 10 wt % with respect to the total weight of the modifier agent. Examples of suitable surfactants include tetraethylene glycol, liponic ethylene glycol 1 (LEG-1), a self-emulsifiable, nonionic wetting agent based on acetylenic diol chemistry (e.g., SURFYNOL® SEF from Air Products and Chemicals, Inc.), a nonionic fluorosurfactants (e.g., CAPSTONE® fluorosurfactants from DuPont, previously known as ZONYL FSO), and combinations thereof.

As noted above, the modifier agent may include a co-solvent, a humectant, and a biocide. In one example, a co-solvent is present in an amount ranging from about 1.0 wt % to about 20 wt %, a humectant in an amount ranging from 0.1 wt % to 15 wt %, and a biocide in an amount ranging from 0.01 wt % to 5 wt %, each of which is with respect to the total weight of the modifier agent. Suitable co-solvents include 2-hydroxyethyl-2-pyrollidinone, 2-pyrollidinone, 1,6-hexanediol, and combinations thereof. Suitable humectants include Di-(2-hydroxyethyl)-5, 5-dimethylhydantoin (e.g., DANTOCOL® DHF from Lonza, Inc.), propylene glycol, hexylene glycol, butylene glycol, glyceryl triacetate, vinyl alcohol, neoagarobiose, glycerol, sorbitol, xylitol, maltitol, polydextrose, quillaia, glycerin, 2-methyl-1,3-propanediol, and combinations thereof. Suitable biocides include an aqueous solution of 1,2-benzisothiazolin-3-one (e.g., PROXEL® GXL from Arch Chemicals, Inc.), quaternary ammonium compounds (e.g., BARDAC® 2250 and 2280, BARQUAT® 50-65B, and CARBOQUAT® 250-T, all from Lonza Ltd. Corp.), and an aqueous solution of methylisothiazolone (e.g., KORDEK® MLX from The Dow Chemical Co.).

In one example, the balance of the modifier agent is water. The amount of water may vary depending upon the amounts of inorganic salt, surfactant, co-solvent, humectant, and biocide.

"A" and "an" used in the dams means one or more.

The examples shown in the figures and described above illustrate but do not limit the invention, which is defined in the following Claims.

What is claimed is:

1. An additive manufacturing process, comprising:
    forming a first layer of build material;
    dispensing a liquid, light absorbing coalescing agent on to build material in the first layer in a pattern of a first slice of an object;
    dispensing a liquid coalescence modifier agent on to build material in the first layer covering an overhang area where a second slice of the object will overhang the first slice, the coalescence modifier agent including an inorganic salt having a melting temperature higher than a melting temperature of the build material, a surfactant, a co-solvent, a humectant, a biocide, and water;

exposing build material in the first layer patterned with coalescing agent to light to generate heat to melt patterned build material in the first layer;

forming a second layer of build material on the first layer of build material;

dispensing the liquid, light absorbing coalescing agent on to build material in the second layer, including the overhang area, in a pattern of the second slice; and exposing build material in the second layer patterned with coalescing agent to light to generate heat to melt patterned build material in the second layer.

2. The process of claim 1, where the coalescing agent is an ink-type formulation that includes carbon black.

3. The process of claim 1, where the inorganic salt is selected from the group consisting of sodium iodide, sodium chloride, sodium bromide, sodium hydroxide, sodium sulfate, sodium carbonate, sodium phosphate, potassium iodide, potassium chloride, potassium bromide, potassium hydroxide, potassium sulfate, potassium carbonate, potassium phosphate, magnesium iodide, magnesium chloride, magnesium bromide, magnesium phosphate, and combinations thereof.

4. A non-transitory processor readable medium having instructions thereon that when executed cause an additive manufacturing machine to:

form a first layer of build material;

dispense a liquid, light absorbing coalescing agent on to build material in the first layer in a pattern of a first slice of an object;

dispense a liquid coalescence modifier agent on to an overhang area of a first layer of build material where a second slice of the object will overhang the first slice, the coalescence modifier agent including an inorganic salt having a melting temperature higher than a melting temperature of the build material, a surfactant, a co-solvent, a humectant, a biocide, and water;

expose build material in the first layer patterned with coalescing agent to light to generate heat to melt patterned build material in the first layer;

form a second layer of build material on the first layer of build material;

dispense the liquid, light absorbing coalescing agent on to build material in the second layer, including the overhang area, in a pattern of the second slice; and expose build material in the second layer patterned with coalescing agent to light to generate heat to melt patterned build material in the second layer.

5. A computer program product that includes the processor readable medium of claim 4.

6. An additive manufacturing machine controller that includes the processor readable medium of claim 4.

7. An additive manufacturing machine, comprising:

a first device to layer powdered build material;

a second device to dispense a liquid, light absorbing coalescing agent on to build material;

a third device to dispense a coalescence modifier agent on to build material;

a light source to apply light energy to build material; and a controller to execute instructions to:

cause the first device to layer build material in a first layer;

cause the second device to dispense a coalescing agent on to build material in the first layer in a pattern of a first slice of an object;

cause the third device to dispense a coalescence modifier agent on to build material in the first layer in an overhang area where a second slice of the object will overhang the first slice, the coalescence modifier agent including an inorganic salt having a melting temperature higher than a melting temperature of the build material, a surfactant, a co-solvent, a humectant, a biocide, and water;

cause the light source to apply light energy to build material in the first layer patterned with coalescing agent to generate heat to melt patterned build material in the first layer;

cause the first device to layer build material in a second layer on the first layer;

cause the second device to dispense the liquid, light absorbing coalescing agent on to build material in the second layer, including the overhang area, in a pattern of the second slice; and cause the third device to apply light energy to build material in the second layer patterned with coalescing agent to generate heat to melt patterned build material in the second layer.

8. The machine of claim 7, where the instructions to cause the third device to dispense a coalescence modifier agent on to build material in the first layer in the overhang area reside on the controller.

* * * * *